United States Patent
Sarkis et al.

(10) Patent No.: US 12,010,658 B2
(45) Date of Patent: Jun. 11, 2024

(54) RESOURCE RESERVATION AND RELEASE IN SIDELINK

(71) Applicant: QUALCOMM Incorporated, San Diego, CA (US)

(72) Inventors: Gabi Sarkis, San Diego, CA (US); Kapil Gulati, Belle Mead, NJ (US); Tien Viet Nguyen, Bridgewater, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/062,049

(22) Filed: Oct. 2, 2020

(65) Prior Publication Data

US 2021/0105746 A1    Apr. 8, 2021

Related U.S. Application Data

(60) Provisional application No. 62/910,968, filed on Oct. 4, 2019.

(51) Int. Cl.
    *H04W 72/04*    (2023.01)
    *H04L 1/1812*   (2023.01)
    *H04L 1/1867*   (2023.01)
    *H04W 72/02*    (2009.01)

(52) U.S. Cl.
    CPC ........... *H04W 72/04* (2013.01); *H04L 1/1812* (2013.01); *H04W 72/02* (2013.01); *H04L 1/1887* (2013.01)

(58) Field of Classification Search
    CPC . H04W 72/04; H04W 72/02; H04W 52/0216; H04W 52/0277; H04W 72/0453; H04W 74/0808; H04W 4/40; H04W 52/0261; H04W 74/0816; H04L 1/1812; H04L 1/1887; H04L 5/0082; Y02D 30/70
    See application file for complete search history.

(56) References Cited

U.S. PATENT DOCUMENTS

| | | | |
|---|---|---|---|
| 2018/0098322 A1* | 4/2018 | Yoon | H04W 72/042 |
| 2019/0306923 A1* | 10/2019 | Xiong | H04L 5/0051 |
| 2020/0068531 A1* | 2/2020 | Sundberg | H04W 52/0216 |
| 2020/0092858 A1* | 3/2020 | Ye | H04L 5/0055 |

(Continued)

OTHER PUBLICATIONS

WO 2018/063085 A1 Apr. 2018.*

(Continued)

*Primary Examiner* — Rushil P. Sampat
(74) *Attorney, Agent, or Firm* — Arun Swain

(57) ABSTRACT

Techniques and apparatus for managing release of resource reservations for sidelink communications are provided. At least one resource reservation is determined from a resource pool having time-frequency resources allocated for sidelink communications with one or more user equipments. Control information that includes an indication of the at least one resource reservation and an indication of whether the at least one resource reservation is releasable is transmitted. A determination of whether to reclaim the at least one resource reservation is made, based on the control information. A set of resource reservations is selected from the resource pool for sidelink communications, based on the determination.

30 Claims, 6 Drawing Sheets

(56) References Cited

U.S. PATENT DOCUMENTS

| | | | |
|---|---|---|---|
| 2020/0178256 A1* | 6/2020 | Tang | H04W 72/0453 |
| 2020/0267729 A1* | 8/2020 | Kim | H04W 72/0453 |
| 2022/0232528 A1* | 7/2022 | Sartori | H04W 72/20 |
| 2022/0279496 A1* | 9/2022 | Hahn | H04W 4/40 |
| 2022/0353846 A1* | 11/2022 | Wang | H04W 72/0446 |

OTHER PUBLICATIONS

WO 2018/175446 A1 Sep. 2018.*
WO 2019/028759 A1 Feb. 2019.*
WO 2020/063611 A1 Apr. 2020.*
Asustek: "Discussion on Mode 2 Resource Allocation in NR V2X", 3GPP Draft, 3GPP TSG RAN WG1 #98, R1-1909306, Discussion on Mode 2 Resource Allocation in NR V2X, 3rd Generation Partnership Project (3GPP), Mobile Competence Centre, 650, Route Des Lucioles, F-06921 Sophia-Antipolis C, vol. RAN WG1, No. Prague, CZ, Aug. 26, 2019-Aug. 30, 2019, Aug. 16, 2019 (Aug. 16, 2019), XP051765913, 3 pages, Retrieved from the Internet: URL: http://www.3gpp.org/ftp/tsg_ran/WG1_RL1/TSGR1_98/Docs/R1-1909306.zip. [retrieved on Aug. 16, 2019] paragraph [0002].
International Search Report and Written Opinion—PCT/US2020/054170—ISA/EPO—dated Dec. 1, 2020.
NEC: "Mode 2 Resource Allocation Mechanism for NR Sidelink", 3GPP Draft, 3GPP TSG RAN WG1 #98, R1-1908852, Mode 2 Resource Allocation Mechanism for NR Sidelink, 3rd Generation Partnership Project (3GPP), Mobile Competence Centre, 650, Route Des Lucioles, F-06921 Sophia-Antipolis CE, vol. RAN WG1, No. Prague, CZ, Aug. 26, 2019-Aug. 30, 2019, Aug. 16, 2019 (Aug. 16, 2019), XP051765460.
Panasonic: "Discussion on Sidelink Feedback in FeD2D", 3GPP Draft, 3GPP TSG RAN WG1 Meeting #90, R1-1713856, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051316650, 3 pages, Retrieved from the Internet: URL: http://www.3gpp.org/ftp/Meetings_3GPP_SYNC/RAN1/Docs/. [retrieved on Aug. 20, 2017] paragraph [0002].

* cited by examiner

RESOURCE RESERVATION AND RELEASE IN SIDELINK

CROSS-REFERENCE TO RELATED APPLICATION

This application claims the benefit of and priority to U.S. Provisional Patent Application Ser. No. 62/910,968, filed Oct. 4, 2019, which is assigned to the assignee hereof and hereby expressly incorporated by reference herein.

BACKGROUND

I. Field of the Disclosure

Aspects of the present disclosure relate to wireless communications, and more particularly, to techniques for managing release of resource reservations for sidelink communications.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved management of resource reservations for sidelink communications.

Certain aspects provide a method for wireless communication by a first user equipment (UE). The method generally includes determining at least one resource reservation from a resource pool comprising a plurality of time-frequency resources allocated for sidelink communications with one or more second UEs. The method also includes transmitting control information comprising a first indication of the at least one resource reservation and a second indication of whether the at least one resource reservation is releasable.

Certain aspects provide an apparatus, such as a UE, for wireless communication. The apparatus generally includes at least one processor, a transmitter, and a memory coupled to the at least one processor. The at least one processor is configured to determine at least one resource reservation from a resource pool comprising a plurality of time-frequency resources allocated for sidelink communications with one or more other apparatuses. The transmitter is configured to transmit control information comprising a first indication of the at least one resource reservation and a second indication of whether the at least one resource reservation is releasable.

Certain aspects provide an apparatus, such as a UE, for wireless communication. The apparatus generally includes means for determining at least one resource reservation from a resource pool comprising a plurality of time-frequency resources allocated for sidelink communications with one or more other apparatuses. The apparatus also includes means for transmitting control information comprising a first indication of the at least one resource reservation and a second indication of whether the at least one resource reservation is releasable.

Certain aspects provide a computer-readable medium having computer executable code stored thereon for wireless communications by a first UE. The computer executable code generally includes code for determining at least one resource reservation from a resource pool comprising a plurality of time-frequency resources allocated for sidelink communications with one or more second UEs. The computer executable code also includes code for transmitting control information comprising a first indication of the at least one resource reservation and a second indication of whether the at least one resource reservation is releasable.

Certain aspects provide a method for wireless communication by a first UE. The method generally includes receiving control information comprising (i) a first indication of at least one resource reservation by a second UE from a resource pool comprising a plurality of time-frequency resources available for sidelink communications and (ii) a second indication of whether the at least one resource reservation is releasable. The method also includes determining whether to reclaim the at least one resource reservation based at least in part on the control information. The method further includes selecting a set of resource reservations from the resource pool to use for sidelink communications based on the determination.

Certain aspects provide an apparatus, such as a UE, for wireless communication. The apparatus generally includes a receiver, at least one processor, and a memory coupled to the at least one processor. The receiver is configured to receive control information comprising (i) a first indication of at least one resource reservation by another apparatus from a resource pool comprising a plurality of time-frequency resources available for sidelink communications and (ii) a second indication of whether the at least one resource reservation is releasable. The at least one processor is configured to determine whether to reclaim the at least one resource reservation based at least in part on the control information. The at least one processor is also configured to select a set of resource reservations from the resource pool to use for sidelink communications based on the determination.

Certain aspects provide an apparatus, such as a UE, for wireless communication. The apparatus generally includes means for receiving control information comprising (i) a first indication of at least one resource reservation by another apparatus from a resource pool comprising a plurality of time-frequency resources available for sidelink communications and (ii) a second indication of whether the at least one resource reservation is releasable. The apparatus also includes means for determining whether to reclaim the at least one resource reservation based at least in part on the control information. The apparatus further includes means for selecting a set of resource reservations from the resource pool to use for sidelink communications based on the determination.

Certain aspects provide a computer readable medium having computer executable code stored thereon for wireless communications by a first UE. The computer executable code generally includes code for receiving control information comprising (i) a first indication of at least one resource reservation by another apparatus from a resource pool comprising a plurality of time-frequency resources available for sidelink communications and (ii) a second indication of whether the at least one resource reservation is releasable. The computer executable code also includes code for determining whether to reclaim the at least one resource reservation based at least in part on the control information. The computer executable code further includes code for selecting a set of resource reservations from the resource pool to use for sidelink communications based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
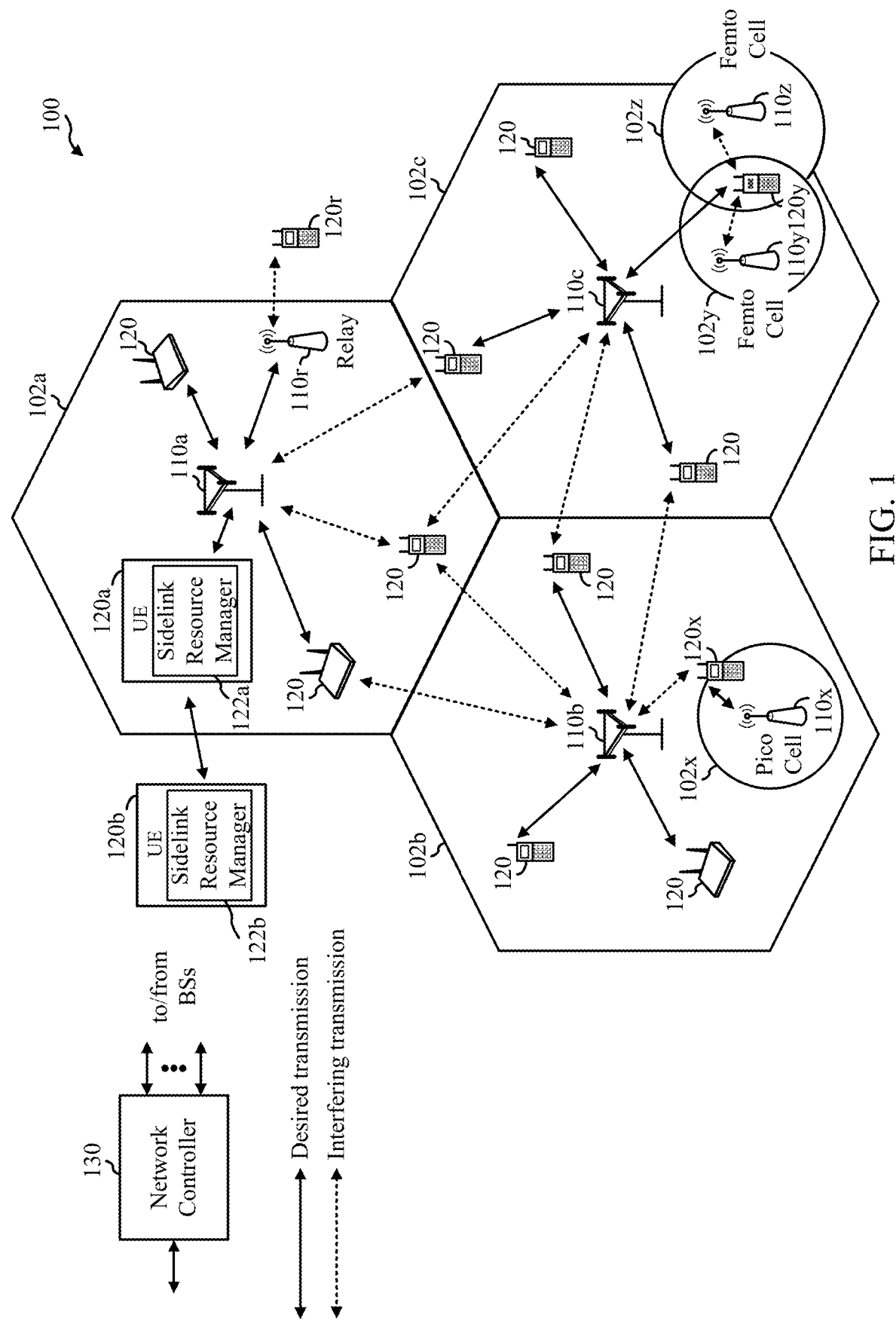
FIG. 1 is a block diagram conceptually illustrating an example telecommunications system, in accordance with certain aspects of the present disclosure.

Aspects of the present disclosure provide apparatus, methods, processing systems, and computer readable mediums for managing release of resource reservations for sidelink communications. In communication systems (e.g., 5G NR) that support sidelink communications, a UE may signal to one or more other UE(s) sidelink control information (SCI) that includes resource (e.g., frequency-domain resources and/or time-domain resources) reservations for sidelink communications. In certain cases, the UE may broadcast the SCI to multiple UEs to enable the UEs to refrain from communicating during the resource reservations. The resources may be reserved from a resource pool that includes resources allocated for sidelink transmission (e.g., configured by a gNB).

The resource reservation(s) may be for transmission of a same transport block (TB) (e.g., re-transmission(s) of the TB) or for transmission of different TBs. In addition, the resource reservation(s) may be for feedback-based transmissions or non-feedback based transmissions. As described in more detail below, in some aspects, one or more of the transmitting UE's resource reservations may be releasable (e.g., available to be reclaimed by another UE), depending in part on the resource reservation (e.g., whether the resource reservation is for (re)-transmission of a same TB as a current TB being transmitted, whether the resource reservation is for transmission of a different TB, whether the resource reservation is for a feedback based transmission, whether the resource reservation is for a non-feedback based transmission, whether the resource reservation is associated with a particular transmission parameter (e.g., modulation and coding scheme (MCS), etc.).

In some systems, a receiving UE may not be able to determine whether a resource reservation by a transmitting UE is capable of being released from SCI transmitted by the transmitting UE. For example, in current systems, the UE typically monitors (e.g., listens to) a feedback channel to determine whether a retransmission will occur. However, this information obtained from monitoring the feedback channel may not be sufficient for determining whether a resource reservation has the potential to be used for transmission of another TB by the transmitting UE.

To address this, aspects provide techniques that enable transmitting UEs to indicate in (and receiving UEs to determine from) SCI whether a resource reservation by the transmitting UE is capable of being released, such that the resource reservation can potentially be used by other UE(s).

Based in part on the indication in SCI, one or more receiving UEs can determine whether to reclaim the resource reservation when selecting resources to reserve from the resource pool for their own sidelink communications. For example, if the receiving UE determines that (1) a resource reservation is releasable, based on the SCI and (2) that the resource is available in the resource pool, then the receiving UE may reclaim that resource reservation for its sidelink communications. On the other hand, if the receiving UE determines at least one of (1) the resource reservation is non-releasable, based on the SCI or (2) the resource is not available in the resource pool, then the receiving UE may refrain from reclaiming the resource reservation for its sidelink communications.

The following description provides examples of managing release of resource reservations for sidelink communications in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for sidelink communications. As shown in FIG. 1, the UE 120a includes a sidelink resource manager 122a and the UE 120b includes a sidelink resource manager 122b. In some aspects, UEs 120a and/or 120b may be transmitting sidelink communications and may use their respective sidelink resource managers to indicate in control information (e.g., SCI) whether one or more resource reservations (being reserved by the UE) are releasable. The resource reservation(s) may be resource(s) reserved by the UE 120a (or UE 120b) in a current transmission by the UE 120a (or UE 120b) that will be used for future transmission(s) by the UE 120a (or UE 120b).

For example, using sidelink resource manager 122a (or sidelink resource manager 122b), UE 120a (or UE 120b) may determine at least one resource reservation from a resource pool that includes multiple time-frequency resources allocated for sidelink communications with one or more other UEs 120. In addition, the UE 120a (or UE 120b) may use sidelink resource manager 122a (or sidelink resource manager 122b) to transmit control information that includes a first indication of the at least one resource reservation and a second indication of whether the at least one resource reservation is releasable.

In some aspects, UEs 120a and/or 120b may be receiving sidelink communications and may use their respective sidelink resource managers to determine, based on receipt of control information from another UE 120, whether a resource reservation (being reserved by the other UE 120) is releasable. For example, using sidelink resource manager 122a (or sidelink resource manager 122b), UE 120a (or UE 120b) may receive control information that includes (i) a first indication of at least one resource reservation by a second UE from a resource pool comprising a plurality of time-frequency resources available for sidelink communications and (ii) a second indication of whether the at least one resource reservation is releasable. Using sidelink resource manager 122a (or sidelink resource manager 122b), UE 120a (or UE 120b) may determine whether to reclaim the at least one resource reservation based at least in part on the control information, and select a set of resource reservations from the resource pool to use for sidelink communications based on the determination.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
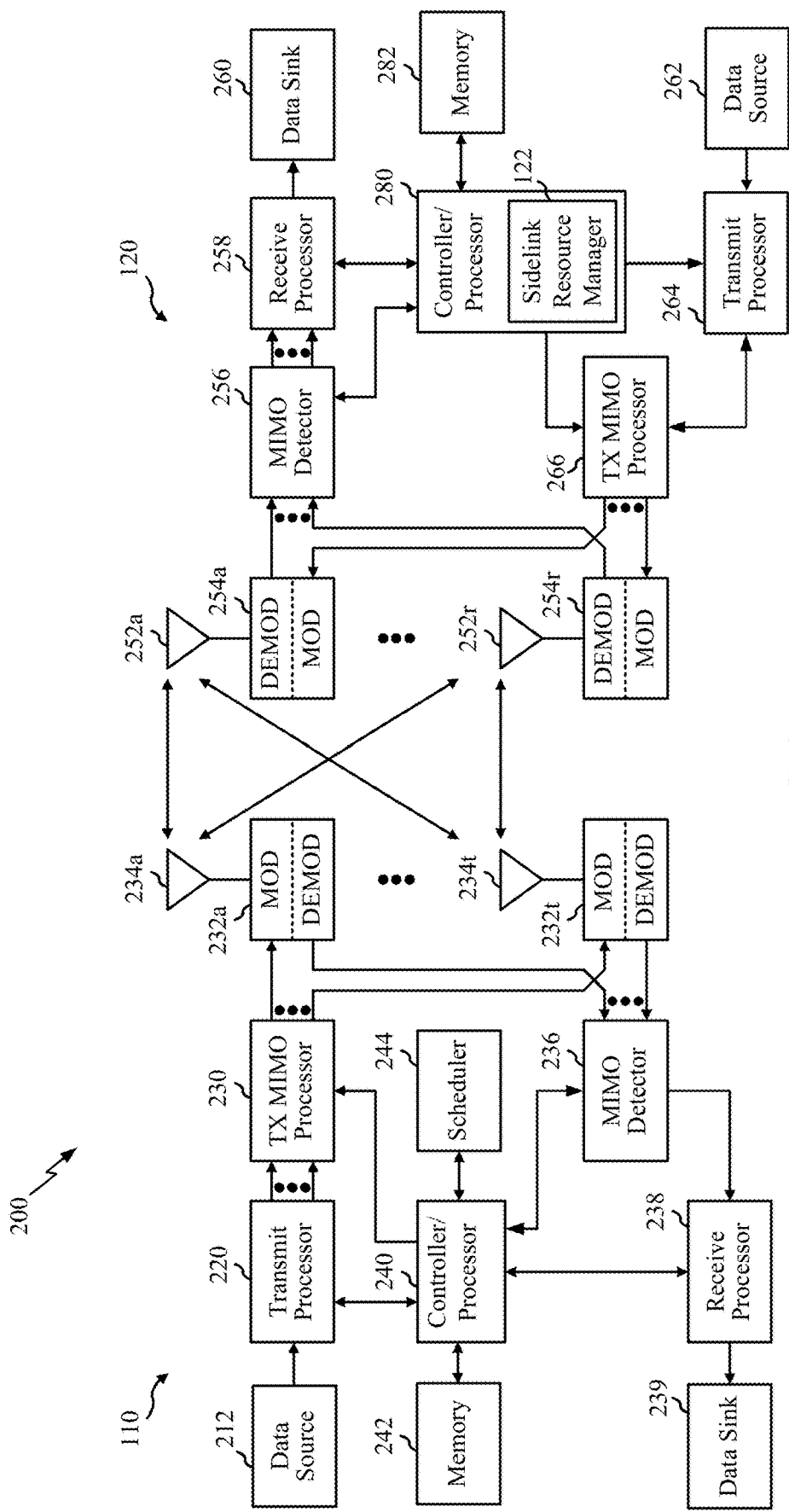
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 280 of the UE 120 (e.g., UE 120*a*) has a sidelink resource manager 122 (e.g., sidelink resource manager 122*a*), which is configured to implement one or more techniques described herein for managing release of resource reservations for sidelink communications, according to aspects described herein. Although shown at the controller/processor, other components of the UE 120 may be used to perform the operations described herein.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120*a*) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as CSI related to a sidelink channel quality. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figure 3B:
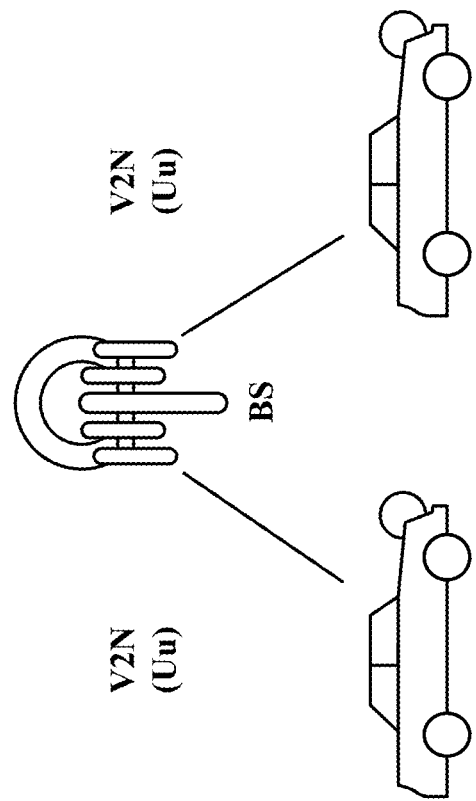
FIG. 3A and FIG. 3B show diagrammatic representations of example vehicle to everything (V2X) systems, in accordance with certain aspects of the present disclosure.
Figure 3A:
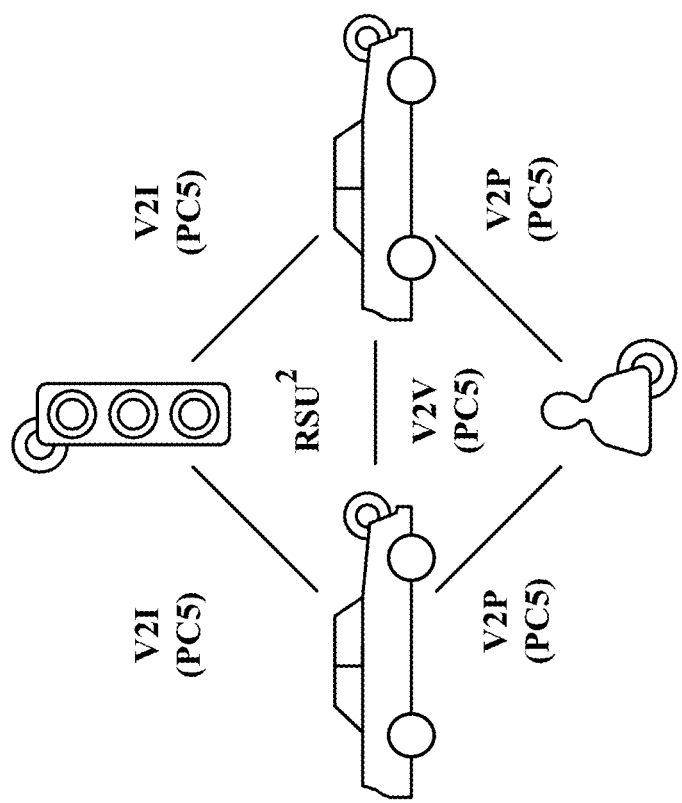

FIG. 3A and FIG. 3B show diagrammatic representations of example V2X systems, in accordance with some aspects of the present disclosure. For example, the vehicles shown in FIG. 3A and FIG. 3B may communicate via sidelink channels and may manage resource reservations and/or release of resource reservations as described herein.

The V2X systems, provided in FIG. 3A and FIG. 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two vehicles 302, 304. The first transmission mode allows for direct communication between different participants in a given geographic location. As illustrated, a vehicle can have a wireless communication link 306 with an individual (V2P) (for example, via a UE) through a PC5 interface. Communications between the vehicles 302 and 304 may also occur through a PC5 interface 308. In a like manner, communication may occur from a vehicle 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a vehicle 352 and a vehicle 354 through a network entity 356. These network communications may occur through discrete nodes, such as a base station (for example, an eNB or gNB), that sends and receives information to and from (for example, relays information between) vehicles 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/ weather reports, and service station availability, among other examples. Such data can be obtained from cloud-based sharing services.

As noted above, some systems (e.g., NR Rel-16) that support sidelink communications may enable UEs to reserve resources for current and/or future transmissions. Resource allocation mode 2 in NR Rel-16, for example, is a reservation based resource allocation mode in which UEs can reserve (time-frequency) resources from a resource pool for one or more transmissions (to other UE(s)). The resource pool (or resource pools) may be resources allocated for sidelink transmission (e.g., configured by the base station (gNB)). The (transmitting) UE may transmit (e.g., broadcast) SCI that includes an indication of the resource reservations by the UE. (Receiving) UEs may use the indication of the resource reservations to determine when to refrain from communicating during the resource reservations. A single SCI may include a maximum number of reservations (such as 2, 3, or 4, resource reservations), which may be a preconfigured value or configurable via control signaling (e.g., radio resource control (RRC) signaling) from a base station (e.g., BS 110a, such as a gNB).

In some cases, there may be situations in which one or more of the resource reservations (for future transmissions) made by a transmitting UE (during a current transmission) can be released by the transmitting UE (and potentially reclaimed by a receiving UE). For example, a given resource reservation for a future transmission may be releasable (e.g., allowing another UE to reclaim it)depending on whether hybrid automatic repeat request (HARQ) feedback is expected for the current transmission. For example, if the resource reservation is for a blind hybrid automatic repeat request (HARQ) (re)transmission of the current TB being transmitted, then the resource reservation may not be dependent on HARQ feedback of the current TB transmission, and the resource reservation may not be releasable. Similarly, if the resource reservation is for a different TB than the current TB being transmitted, then the resource reservation may not be dependent on HARQ feedback of the current TB transmission, and the resource reservation may not be releasable. On the other hand, if the resource reservation is for HARQ (re)transmission of the current TB being transmitted and/or for the same TB as the current TB being transmitted, then resource reservation may be dependent on HARQ feedback of the current TB transmission, and the resource reservation may be releasable.

In some systems, however, a transmitting UE may not be able to indicate in (and a receiving UE may not be able to determine from) SCI whether a resource reservation by the transmitting UE is capable of being released. Accordingly, it may be desirable to provide techniques that enable sidelink devices to indicate in and/or determine from SCI whether a resource reservation can be released (e.g., is releasable). Doing so can improve the management of resource reservations in communication systems that support sidelink communications.

Example Resource Reservation and Release in Sidelink

Aspects of the present disclosure provide techniques for improving the management of release of resource reservations for sidelink communications. More specifically, aspects provide techniques that enable a (transmitting) UE to indicate to other UE(s) whether a future reserved resource (e.g., for a future transmission by the transmitting UE) being reserved in a current transmission (by the transmitting UE)

is releasable. Note that, as used herein, indicating whether a resource reservation is "releasable" is an indication of whether the resource reservation "can" be released (e.g., has the potential of being released), as opposed to an indication that the resource reservation "is" actually released. As described in more detail below, when the transmitting UE indicates that a resource reservation is "releasable," one or more other UEs may monitor a feedback channel to determine whether the resource reservation will be used and whether it can be reclaimed.

Figure 4:
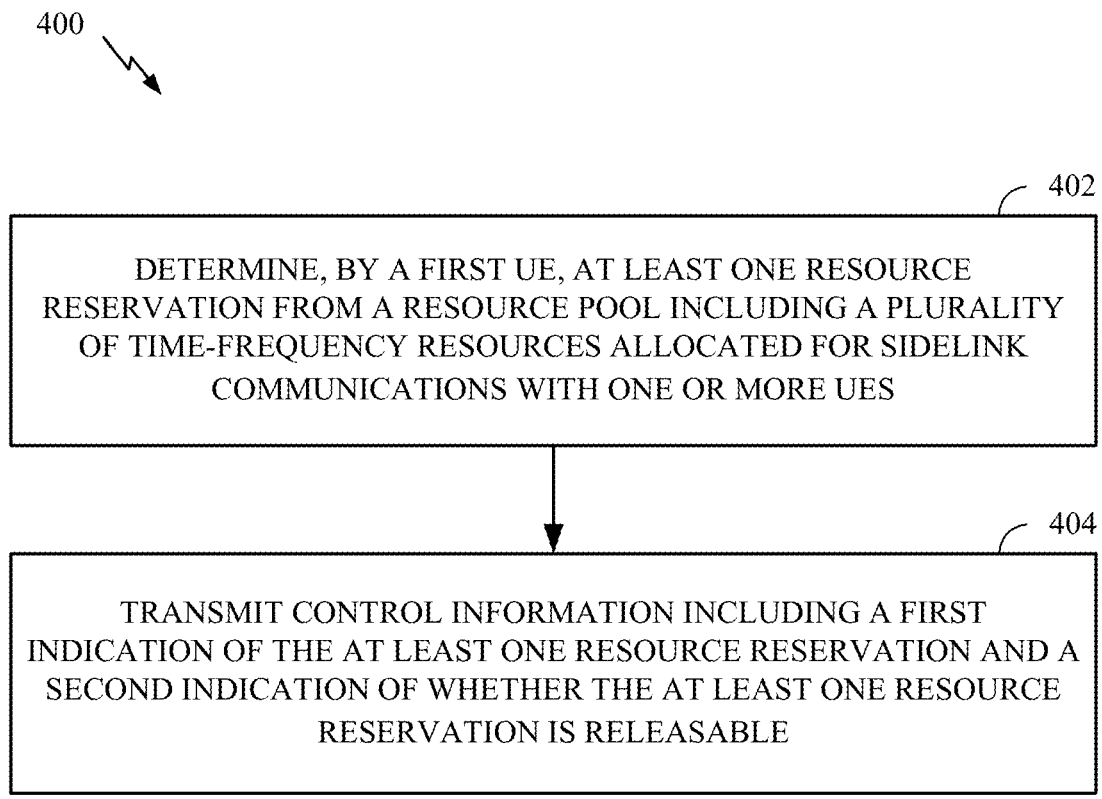
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed by a (first) UE (e.g., UE 120a or UE 120b in the wireless communication network 100). For example, the (first) UE may be transmitting data to one or more other UEs as part of sidelink communications. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 402, where the (first) UE determines at least one resource reservation from a resource pool that includes multiple time-frequency resources allocated for sidelink communications with one or more (second) UEs. At 404, the UE transmits control information that includes a first indication of the at least one resource reservation and a second indication of whether the at least one resource reservation is releasable. In one aspect, the control information may indicate in a current transmission by the UE resource reservations for future transmissions by the UE. That is, the control information may be associated with a first transmission (by the first UE) sent at a first time and the at least one resource reservation may be allocated to a second transmission to be sent (by the first UE) at a subsequent second time.

Figure 5:
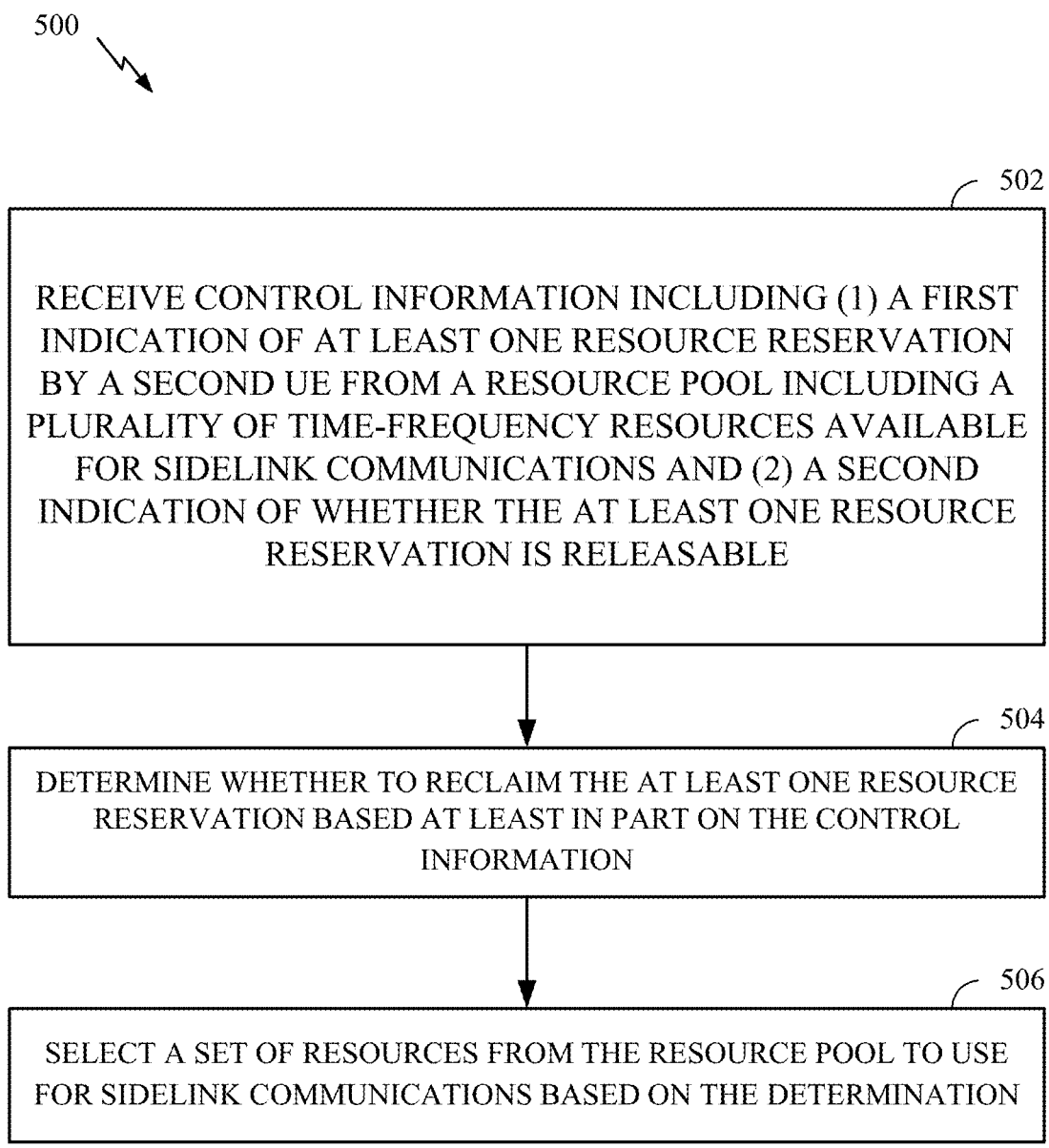
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 400 may be performed by a (first) UE (e.g., UE 120a or UE 120b in the wireless communication network 100). For example, the (first) UE may be an intended recipient of transmissions from another transmitting UE and/or may not be an intended recipient of transmissions from a transmitting UE (e.g., the UE may be in the process of selecting resources to use for a sidelink communication). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 502, where the (first) UE receives control information that includes (i) a first indication of at least one resource reservation by a second (transmitting) UE from a resource pool comprising a plurality of time-frequency resources available for sidelink communications and (ii) a second indication of whether the at least one resource reservation is releasable. In one aspect, the (first) UE may receive the control information as part of a current transmission by the (second) UE, where the resource reservations are for future transmissions by the (second) UE. That is, the control information may be associated with a first transmission sent by the second UE at a first time and the at least one resource reservation may be allocated to a second transmission to be sent by the second UE at a subsequent second time.

At 504, the UE determines whether to reclaim the at least one resource reservation based at least in part on the control information. At 506, the UE selects a set of resource reservations from the resource pool to use for sidelink communications based on the determination.

In some aspects, the second indication in SCI (e.g., in operations 402 and 502) may include an explicit indication of whether the at least one resource reservation is releasable. For example, the SCI may include a dedicated field with one or bits to indicate that the at least one resource reservation is releasable or non-releasable. In one aspect, the dedicated field may include a bitmap, with each bit in the bitmap indicating whether a different resource reservation is releasable. Assuming, for example, that the SCI includes 4 resource reservations, the dedicated field may include "1011," indicating that resource reservation (RR)1, RR3, and RR4 (with bit values "1") are releasable, and RR2 (with bit value "0") is non-releasable. Note, however, that this is merely a reference example and other values can be used to explicitly indicate whether a resource reservation is releasable.

In some aspects, the second indication in SCI (e.g., in operations 402 and 502) may include an implicit indication of whether the at least one resource reservation is releasable. The implicit indication may be based on a type of the resource reservation (also referred to herein as a type of the transmission associated with the resource reservation). In one aspect, for example, the implicit indication may be an indication of at least one of: whether the transmission is for same TB or different TB than a current transmission or whether the transmission is a feedback based transmission or a non-feedback based transmission.

In some aspects, the SCI may implicitly indicate via a value of a field in SCI whether the at least one resource reservation is releasable. For example, the second indication may include an indication of whether the second transmission is a feedback based transmission or a non-feedback based transmission. If the second indication indicates a feedback based transmission, then the resource reservation may be releasable. The feedback based transmission may include a transmission associated with HARQ feedback. For example, the resource reservation may be for a HARQ (re)transmission of the TB being transmitted in the current transmission. In this case, whether the resource reservation is actually used may depend on the HARQ feedback of the current transmission. If a NACK is received, then the transmitting UE can use the resource reservation to retransmit the TB. On the other hand, if an ACK is received, the transmitting UE may not use the resource reservation for retransmission of the TB. In other HARQ feedback modes, the transmitting UE may not receive an ACK if the current transmission is successful, but rather may receive a NACK in the event the current transmission is unsuccessful. In this case, the transmitting UE may not use the resource reservation to retransmit the TB if an ACK is not received after a predetermined amount of time has elapsed since the transmission of the TB.

If the second indication indicates a non-feedback based transmission, then the resource reservation may not be releasable. A non-feedback based transmission may be a transmission that does not require HARQ feedback. One example of a non-feedback based transmission may include a blind HARQ (re)transmission of a TB. Another example of a non-feedback based transmission may include a transmission for a different TB than the TB being currently transmitted.

In some aspects, the SCI may implicitly indicate via a value of a MCS field in SCI whether the at least one resource reservation is releasable. For example, the second indication (e.g., in operations 402) may include an indication of at least one MCS. If the value of the MCS field (or MCS index) satisfies a predetermined condition, then the resource reservation may be releasable. If the value of the MCS field does not satisfy the predetermined condition, then the resource reservation may not be releasable. In one aspect, the predetermined condition may be a reserved MCS index.

In some aspects, the second indication (e.g., in operations 402) may include an indication of whether the second transmission is for a same TB as the first transmission. For example, if the second transmission is for a same TB as the first transmission, then the at least one resource reservation (allocated to the second transmission) may be releasable. On the other hand, if the second transmission is for a different TB than the first transmission, then the at least one resource reservation (allocated to the second transmission) may not be releasable.

In some aspects, if the second indication indicates that the second transmission is for a different TB than the first transmission, this may further implicitly indicate that the first transmission and the second transmission are associated with a same service data unit (SDU). That is, the SCI may implicitly indicate that the resource reservation is for a different TB that is a segment of the same radio link control (RLC) service data unit (SDU) as the current TB being transmitted. For example, in some systems, a single SCI may not be able to indicate a resource reservation for a different TB that belongs to a different SDU than the current TB being transmitted.

Similarly, in some aspects, a UE that receives the SCI (e.g., in operations 502) can determine whether a resource reservation is releasable based on the explicit indication in the SCI or implicit indication in the SCI. The UE (e.g., in operations 504) may determine to reclaim the at least one resource reservation if the at least one resource reservation is releasable and the at least one resource reservation has been released. In one aspect, the UE (e.g., in operations 504) may monitor a feedback channel to determine whether the at least one resource reservation has been released. For example, the UE can determine that the resource reservation will not be used (e.g., the resource reservation has been released) if an ACK is detected for the first transmission or an ACK is not detected after a predetermined amount of time (after transmission of the first transmission). In another example, the UE can determine that the resource reservation will be used (e.g., the resource reservation has not been released) if a NACK is detected for the first transmission.

Figure 6:
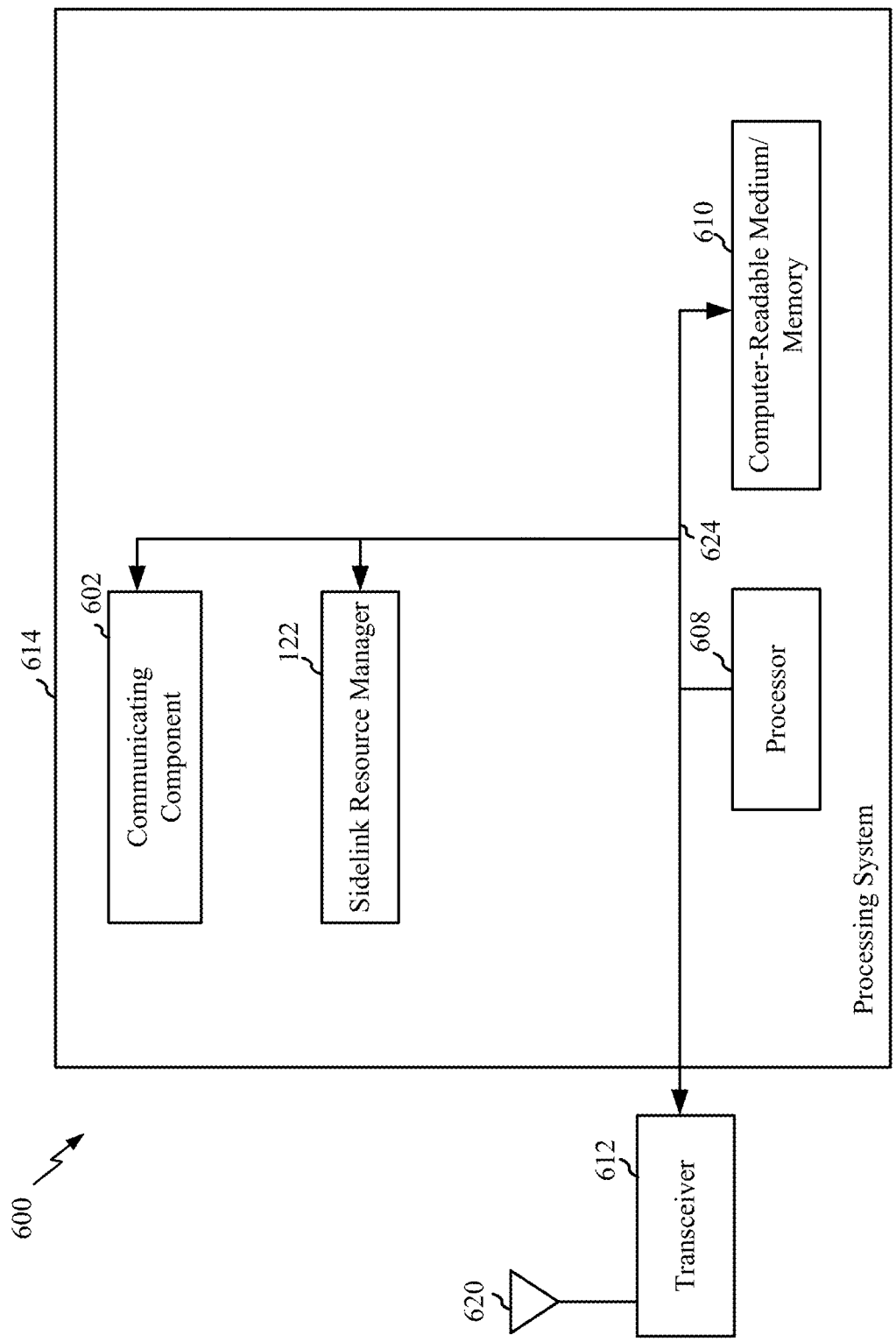
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIGS. 4-5. The communications device 600 includes a processing system 614 coupled to a transceiver 612. The transceiver 612 is configured to transmit and receive signals for the communications device 600 via an antenna 620, such as the various signals described herein. The processing system 614 may be configured to perform processing functions for the communications device 600, including processing signals received and/or to be transmitted by the communications device 600.

The processing system 614 includes a processor 608 coupled to a computer-readable medium/memory 610 via a bus 624. In certain aspects, the computer-readable medium/memory 610 is configured to store instructions that when executed by processor 608, cause the processor 608 to perform the operations illustrated in FIGS. 4-5 and/or other operations for performing the various techniques discussed herein.

In certain aspects, the processing system 614 further includes a communicating component 602 for performing the operations illustrated at 404 in FIG. 4, 502 in FIG. 5, and/or other communication operations described herein. Additionally, the processing system 614 includes a sidelink resource manager 122 for performing the operations illustrated at 402 in FIG. 4, 504 and 506 in FIG. 5, and/or operations described herein. The communicating component 602 and sidelink resource manager 122 may be coupled to the processor 608 via bus 624. In certain aspects, the communicating component 602 and sidelink resource manager 122 may be hardware circuits. In certain aspects, the communicating component 602 and sidelink resource manager 122 may be software components that are executed and run on processor 608.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
reserving at least one resource from a resource pool comprising a plurality of time-frequency resources allocated for sidelink communications with one or more second UEs, wherein reserving the at least one resource results in at least one resource reservation; and
transmitting control information comprising a first indication of the at least one resource reservation and a second indication of whether the at least one resource reservation is releasable, wherein the second indication indicates whether the at least one resource reserved by the first UE can be reclaimed by the one or more second UEs based on the at least one resource being for a feedback based transmission.

2. The method of claim 1, wherein the control information is associated with a first transmission sent at a first time and the at least one resource reservation is allocated to a second transmission to be sent at a subsequent second time.

3. The method of claim 1, wherein the second indication comprises an explicit indication of whether the at least one resource reservation is releasable.

4. The method of claim 2, wherein the second indication comprises an implicit indication of whether the at least one resource reservation is releasable.

5. The method of claim 4, wherein the implicit indication indicates whether the second transmission is the feedback based transmission or a non-feedback based transmission.

6. The method of claim 5, wherein: the feedback based transmission comprises a transmission associated with hybrid automatic repeat request (HARQ) feedback; and the non-feedback based transmission comprises a transmission that does not require hybrid automatic repeat request (HARQ) feedback.

7. The method of claim 5, wherein the at least one resource reservation is releasable when the second transmission is the feedback based transmission.

8. The method of claim 5, wherein the at least one resource reservation is non-releasable when the second transmission is a non-feedback based transmission.

9. The method of claim 4, wherein the implicit indication indicates whether the second transmission is for a same transport block as the first transmission.

10. The method of claim 9, wherein the at least one resource reservation is releasable when the second transmission is for the same transport block as the first transmission.

11. The method of claim 9, wherein the at least one resource reservation is non-releasable when the second transmission is for a different transport block than the first transmission.

12. The method of claim 9, wherein: the implicit indication indicates the second transmission is for a different transport block than the first transmission; and the first transmission and the second transmission are associated with a same service data unit (SDU).

13. An apparatus for wireless communications, comprising:
at least one processor configured to reserve at least one resource from a resource pool comprising a plurality of time-frequency resources allocated for sidelink communications with one or more other apparatuses, wherein reserving the at least one resource results in at least one resource reservation;
a transmitter configured to transmit control information comprising a first indication of the at least one resource reservation and a second indication of whether the at least one resource reservation is releasable, wherein the second indication indicates whether the at least one resource reserved by the apparatus can be reclaimed by one or more user equipments (UEs) based on the at least one resource being for a feedback based transmission; and
a memory coupled to the at least one processor.

14. The apparatus of claim 13, wherein the second indication comprises (i) an explicit indication of whether the at least one resource reservation is releasable or (ii) an implicit indication of whether the at least one resource reservation is releasable.

15. A method for wireless communications by a first user equipment (UE), comprising:
receiving control information comprising (i) a first indication of at least one resource reservation by a second UE from a resource pool comprising a plurality of time-frequency resources available for sidelink communications and (ii) a second indication of whether the at least one resource reservation is releasable, wherein the at least one resource reservation comprises reservation of at least one resource from the resource pool by the second UE, and wherein the second indication indicates whether the at least one resource reserved by the second UE can be reclaimed by the first UE based on the at least one resource being for a feedback based transmission;
reclaiming the at least one resource reservation based at least in part on the control information; and
selecting a set of resource reservations from the resource pool to use for sidelink communications based on reclaiming the at least one resource reservation.

16. The method of claim 15, wherein the control information is associated with a first transmission sent by the second UE at a first time and the at least one resource reservation is allocated to a second transmission to be sent by the second UE at a subsequent second time.

17. The method of claim 15, wherein the second indication comprises an explicit indication of whether the at least one resource reservation is releasable.

18. The method of claim 16, wherein the second indication comprises an implicit indication of whether the at least one resource reservation is releasable.

19. The method of claim 18, wherein the implicit indication indicates whether the second transmission is the feedback based transmission or a non-feedback based transmission.

20. The method of claim 19, wherein: the feedback based transmission comprises a transmission associated with hybrid automatic repeat request (HARQ) feedback; and
the non-feedback based transmission comprises a transmission that does not require hybrid automatic repeat request (HARQ) feedback.

21. The method of claim 19, further comprising determining the at least one resource reservation is releasable when the second transmission is the feedback based transmission.

22. The method of claim 19, wherein the at least one resource reservation is non-releasable when the second transmission is a non-feedback based transmission.

23. The method of claim 18, wherein the implicit indication indicates whether the second transmission is for a same transport block as the first transmission.

24. The method of claim 23, further comprising determining the at least one resource reservation is releasable when the second transmission is for the same transport block as the first transmission.

25. The method of claim 23, wherein the at least one resource reservation is non-releasable when the second transmission is for a different transport block than the first transmission.

26. The method of claim 15, wherein the at least one resource reservation is reclaimed when the at least one resource reservation is releasable and the at least one resource reservation has been released.

27. The method of claim 26, further comprising monitoring a feedback channel to determine whether the at least one resource reservation has been released.

28. The method of claim 15, wherein the at least one resource reservation is not reclaimed when at least one of: (i) the at least one resource reservation is non-releasable or (ii) the at least one resource reservation has not been released.

29. An apparatus for wireless communication, comprising:
a receiver configured to receive control information comprising (i) a first indication of at least one resource reservation by another apparatus from a resource pool comprising a plurality of time-frequency resources available for sidelink communications and (ii) a second indication of whether the at least one resource reservation is releasable, wherein the at least one resource reservation comprises reservation of at least one resource from the resource pool by a user equipment (UE), and wherein the second indication indicates whether the at least one resource reserved by the UE can be reclaimed by apparatus based on the at least one resource being for a feedback based transmission;
at least one processor configured to:
reclaim the at least one resource reservation based at least in part on the control information; and
select a set of resource reservations from the resource pool to use for sidelink communications based on reclaiming the at least one resource reservation; and
a memory coupled to the at least one processor.

30. The apparatus of claim 29, wherein the second indication comprises (i) an explicit indication of whether the at least one resource reservation is releasable or (ii) an implicit indication of whether the at least one resource reservation is releasable.

* * * * *